United States Patent
Suetsugu

(10) Patent No.: US 8,064,318 B2
(45) Date of Patent: Nov. 22, 2011

(54) OPTICAL PICKUP APPARATUS WITH PROTECTED COLLIMATOR LENS

(75) Inventor: Masaaki Suetsugu, Daito (JP)

(73) Assignee: Funai Electric Co., Ltd. (JP)

( * ) Notice: Subject to any disclaimer, the term of this patent is extended or adjusted under 35 U.S.C. 154(b) by 1120 days.

(21) Appl. No.: 11/892,836

(22) Filed: Aug. 28, 2007

(65) Prior Publication Data

US 2008/0077946 A1 Mar. 27, 2008

(30) Foreign Application Priority Data

Sep. 26, 2006 (JP) ................................. 2006-259880

(51) Int. Cl.
*G11B 7/135* (2006.01)
*G11B 7/22* (2006.01)

(52) U.S. Cl. .................. 369/112.23; 720/652

(58) Field of Classification Search .......... 359/811–830; 369/44.14–44.22, 112.01, 112.23–112.26; 720/652, 672–687
See application file for complete search history.

(56) References Cited

U.S. PATENT DOCUMENTS

| | | | |
|---|---|---|---|
| 6,625,091 B2 | 9/2003 | Obara | 369/44.14 |
| 2001/0028628 A1 * | 10/2001 | Suzuki et al. | 369/244 |

FOREIGN PATENT DOCUMENTS

| | | |
|---|---|---|
| JP | 08-161756 | 6/1996 |
| JP | 2001-319342 | 11/2001 |
| JP | 2004-199724 | 7/2004 |

* cited by examiner

*Primary Examiner* — Nathan Danielsen
(74) *Attorney, Agent, or Firm* — Bacon & Thomas, PLLC

(57) ABSTRACT

There is provided an optical pickup apparatus in which the collimator lens cannot be scratched before the support base for the objective lens actuator is fixed, and further dust can hardly come in and be deposited to result in contaminating the collimator lens and thereby degrading the performance for recording and/or reproduction. A pair of movement limiting walls 11 and 11 for limiting the horizontal movement of a support base 3 for an objective lens actuator 2 are formed on the upper surface of a base chassis 1 as contact prevention means for preventing the support base 3 from coming into contact with a collimator lens 5 before the support base 3 is fixed. The movement limiting walls 11 and 11 prevent the support base 3 from coming into contact with and scratching the collimator lens 5. Each movement limiting wall 11 has a wall length equal to or greater than the diameter of the collimator lens 5 to serve as a dust prevention wall, whereby dust can hardly come in and be deposited to result in contaminating the collimator lens 5 and thereby degrading the performance for recording and/or reproduction.

2 Claims, 4 Drawing Sheets

OPTICAL PICKUP APPARATUS WITH PROTECTED COLLIMATOR LENS

BACKGROUND OF THE INVENTION

1. Field of the Invention

The present invention relates to optical pickup apparatuses to be mounted on an optical disk apparatus and, in particular, to an optical pickup apparatus improved so that the collimator lens is not scratched.

2. Description of the Related Art

Conventional optical pickup apparatuses to be mounted on an optical disk apparatus have a structure in which a laser diode, a grating, a polarizing beam splitter or a half mirror, a raising mirror, and a light detector, etc., are installed on the lower surface (first surface) of a base chassis, while a collimator lens is installed in a hole in the base chassis above the raising mirror in such a manner as to be exposed at the upper surface (second surface) of the base chassis, and a support base for an objective lens actuator is fixed to the upper surface of the base chassis.

It will be appreciated that such optical pickup apparatuses should be assembled in such a manner as not to scratch the collimator lens or other optical components.

Meanwhile, there has been proposed an optical pickup apparatus in which the allowable displacement of an objective lens holder in the tracking direction is limited by erecting a pair of stopper walls on the upper surface of a base chassis and inserting the pair of stopper walls into through holes in a support base for an objective lens actuator when mounting the support base on the base chassis to arrange the pair of stopper walls on either side of the objective lens holder (refer to Japanese Patent Laid-Open Publication No. 2001-319342).

There has also been proposed an objective lens positioning mechanism in which an actuator base is positioned tiltably in all directions against an optical body by providing a spherical or conical convex portion on either one of the optical body and the actuator base and fitting the convex portion into a circular recessed portion or hole provided in the other one of the optical body and the actuator base (refer to Japanese Patent Laid-Open Publication No. Hei 8-161756).

However, in such conventional optical pickup apparatuses as mentioned above, since the collimator lens is exposed at the upper surface of the base chassis and the objective lens actuator is movable horizontally on the upper surface of the base chassis until positioned and fixed adhesively to the base chassis, the support base for the objective lens actuator may come into contact with the collimator lens that is exposed at the upper surface of the base chassis to scratch the collimator lens. Alternatively, even in optical pickup apparatuses assembled without scratching the collimator lens, there is a possibility that dust comes in through the clearance between the support base and the base chassis in the vicinity of the collimator lens to be deposited on the collimator lens over time, resulting in contaminating the collimator lens to degrade the performance for recording and/or reproduction.

These problems cannot be solved easily even by employing such a technique as disclosed in Japanese Patent Laid-Open Publication No. 2001-319342, which intends to limit the allowable displacement of the objective lens holder in the tracking direction by erecting a pair of stopper walls on the upper surface of the base chassis and not at all intend to prevent scratching the collimator lens, or cannot be solved even by employing such a technique as disclosed in Japanese Patent Laid-Open Publication No. Hei 8-161756, in which the actuator base is positioned tiltably in all directions against the optical body.

SUMMARY OF THE INVENTION

The present invention has been made under the above-described circumstances, and an object thereof is to provide an optical pickup apparatus in which the collimator lens cannot be scratched before the support base for the objective lens actuator is fixed to the upper surface of the base chassis, and further dust can hardly come in and be deposited to result in contaminating the collimator lens and thereby degrading the performance for recording and/or reproduction.

In order to achieve the foregoing object, in an optical pickup apparatus according to the present invention in which a laser diode, a grating, a polarizing beam splitter or a half mirror, a raising mirror, and a light detector are installed on a first surface of a base chassis, while a collimator lens is installed in a hole in the base chassis above the raising mirror in such a manner as to be exposed at a second surface of the base chassis, and a support base for an objective lens actuator is fixed to the second surface of the base chassis, contact prevention means for preventing the support base from coming into contact with the collimator lens is formed on the second surface of the base chassis.

In the optical pickup apparatus according to the present invention, a pair of movement limiting walls for limiting the horizontal movement of the support base are preferably formed on the second surface of the base chassis as the contact prevention means in such a manner that movement spaces for adjusting the position of the objective lens actuator remain between the movement limiting walls and the support base. Further, the pair of movement limiting walls are preferably formed approximately symmetrically in the vicinity of the collimator lens on the second surface of the base chassis.

Then, in a further specified preferable optical pickup apparatus according to the present invention in which a laser diode, a grating, a polarizing beam splitter or a half mirror, a raising mirror, and a light detector are installed on a first surface of a base chassis, while a collimator lens is installed in a hole in the base chassis above the raising mirror in such a manner as to be exposed at a second surface of the base chassis, and a support base for an objective lens actuator is fixed to the second surface of the base chassis, a pair of movement limiting walls having a wall length equal to or greater than the diameter of the collimator lens to limit the horizontal movement of leg pieces included in the support base are formed approximately symmetrically in the vicinity of the collimator lens on the second surface of the base chassis as contact prevention means for preventing the support base from coming into contact with the collimator lens in such a manner that movement spaces for adjusting the position of the objective lens actuator remain between the movement limiting walls and the leg pieces.

In the optical pickup apparatus according to the present invention, the contact prevention means formed on the second surface of the base chassis prevents the support base from coming into contact with the collimator lens before the support base for the objective lens actuator is fixed, which eliminates the possibility that the collimator lens is scratched.

Particularly, in the optical pickup apparatus in which the pair of movement limiting walls for limiting the horizontal movement of the support base to prevent the support base for the objective lens actuator from coming into contact with the collimator lens are formed on the second surface of the base chassis as the contact prevention means in such a manner that movement spaces for adjusting the position of the objective lens actuator remain between the movement limiting walls and the support base, the movement limiting walls cannot disturb the operation of adjusting the position of the objective lens actuator, and the horizontal movement of the support base for the objective lens actuator is limited by the movement limiting walls to prevent the support base from coming into contact with the collimator lens.

Also, in the optical pickup apparatus in which the pair of movement limiting walls are formed approximately symmetrically in the vicinity of the collimator lens on the second surface of the base chassis, the collimator lens is protected between the movement limiting walls and the movements of the support base from both one side and the other side toward the collimator lens are limited, which prevents the support base from coming into contact with the collimator lens more reliably and thereby increases the effect of preventing scratching the collimator lens.

Then, in the further specified preferable optical pickup apparatus in which the pair of movement limiting walls having a wall length equal to or greater than the diameter of the collimator lens are formed approximately symmetrically in the vicinity of the collimator lens on the second surface of the base chassis, the effect of preventing scratching the collimator lens is increased, as is the case above and, in addition, the movement limiting walls serve as dust prevention walls to prevent dust from coming in through the clearance between the leg pieces in the support base for the objective lens actuator and the second surface of the base chassis in the vicinity of the collimator lens, whereby dust can hardly come in and be deposited to result in contaminating the collimator lens and thereby degrading the performance for recording and/or reproduction.

DESCRIPTION OF THE PREFERRED EMBODIMENTS

Specific embodiments of the present invention will hereinafter be described in detail with reference to the accompanying drawings.

Figure 1:
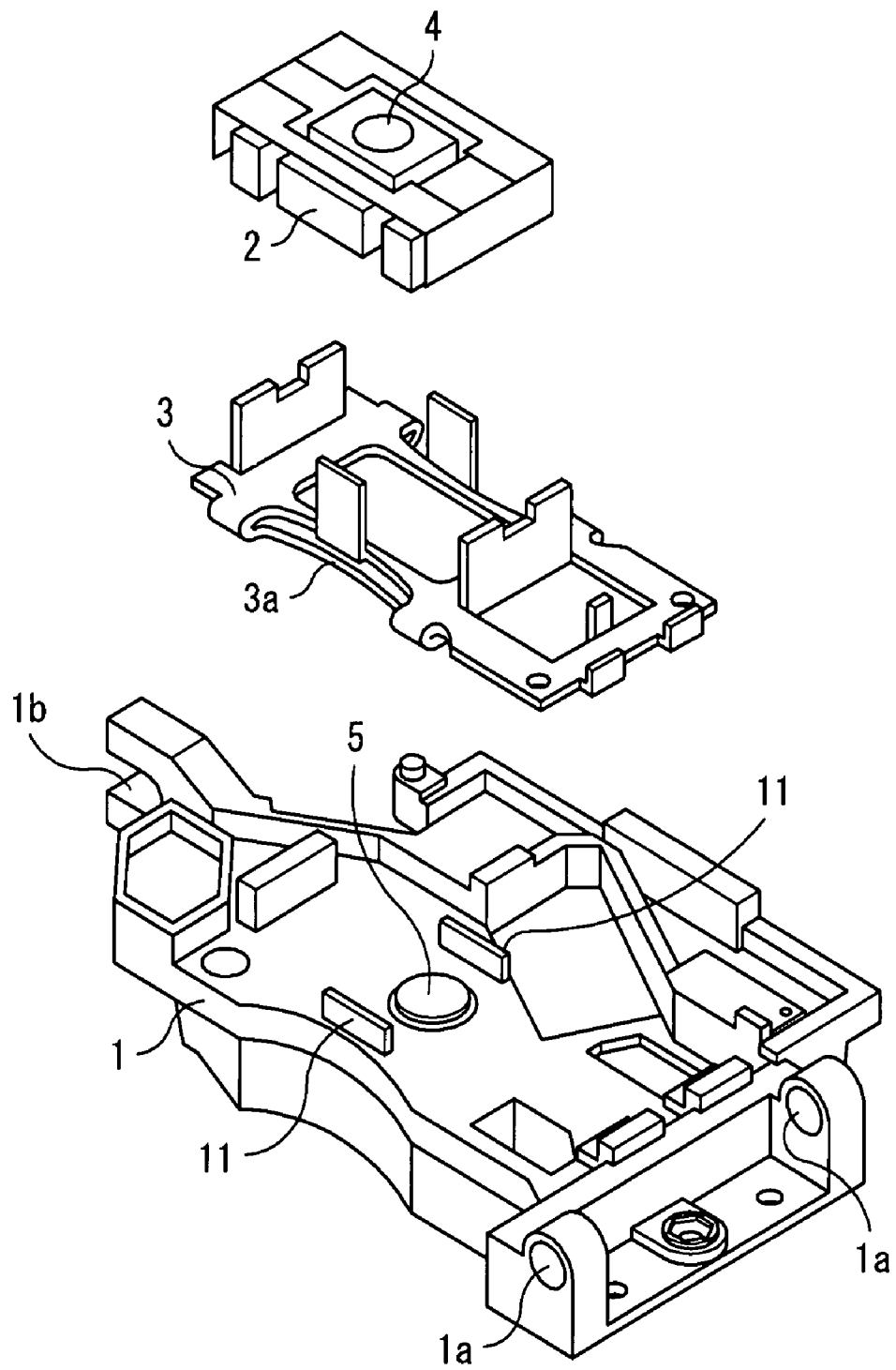
FIG. 1 is an exploded perspective view of an optical pickup apparatus according to an embodiment of the present invention.
Figure 2:
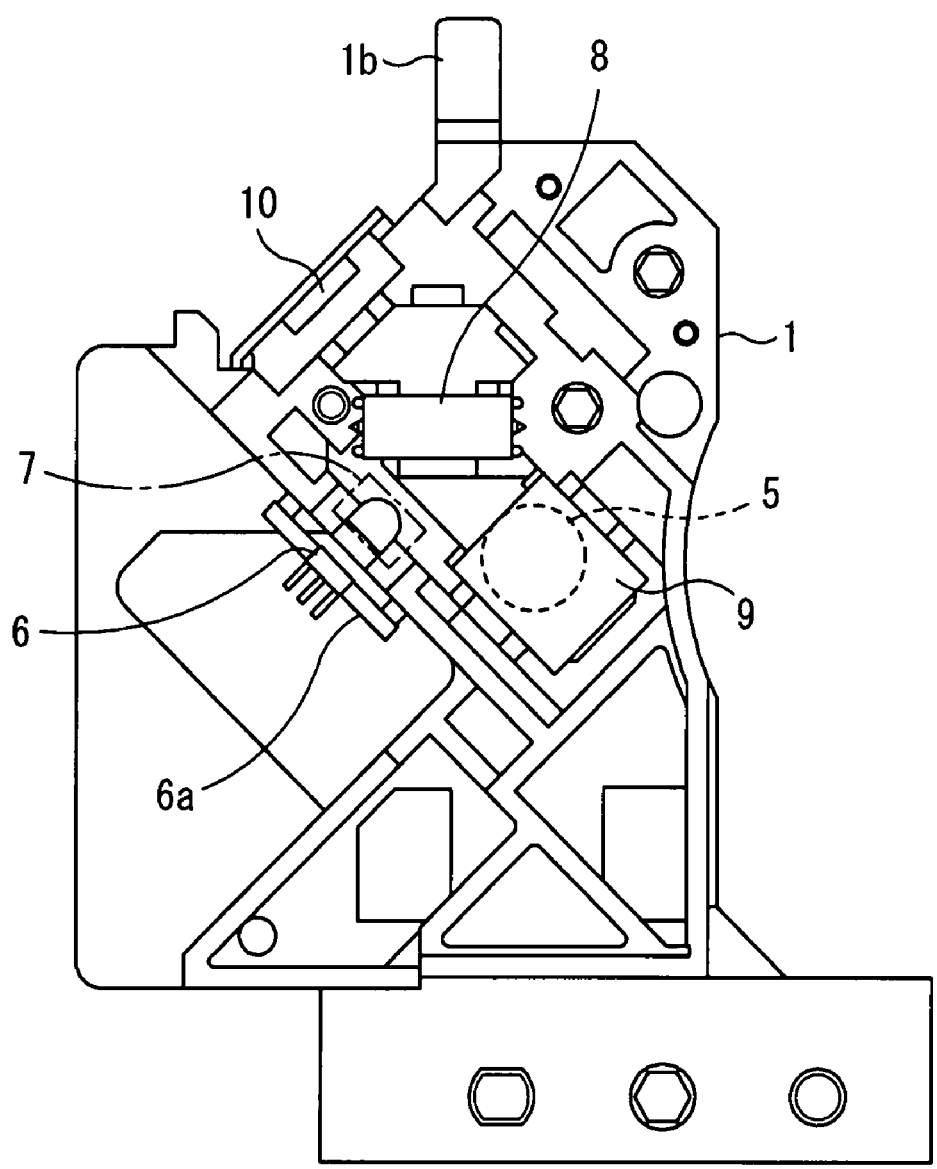
FIG. 2 is a bottom view of the optical pickup apparatus.
Figure 3:
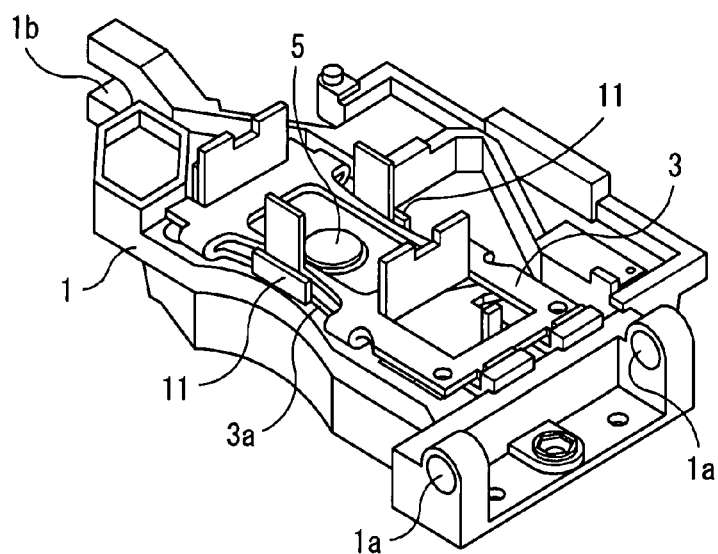
FIG. 3 is a perspective view of the optical pickup apparatus showing a state where the objective lens actuator is omitted and the support base therefore is only placed on the base chassis.
Figure 4:
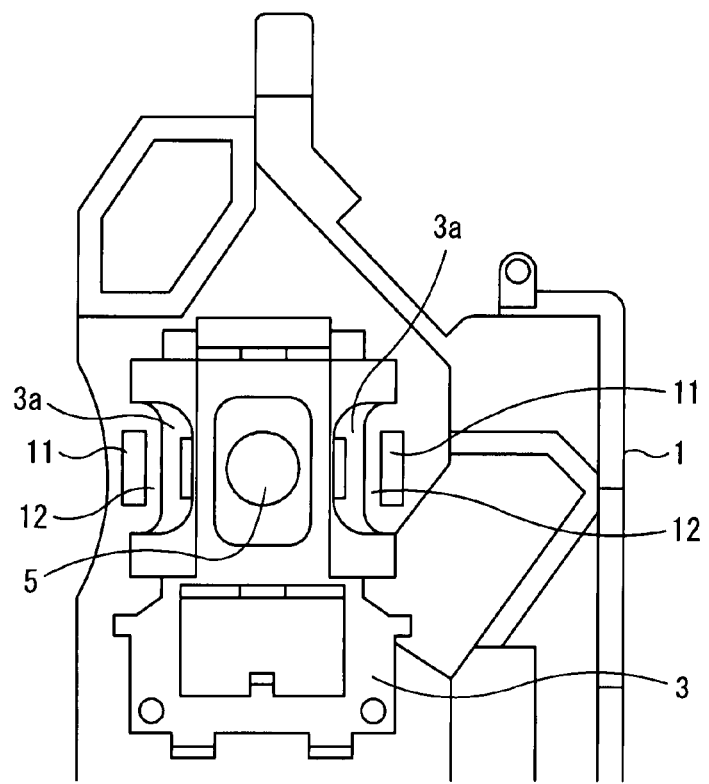
FIG. 4 is a partial plan view of the optical pickup apparatus showing a state where the objective lens actuator is omitted and the support base therefor is only placed on the base chassis.
Figure 5:
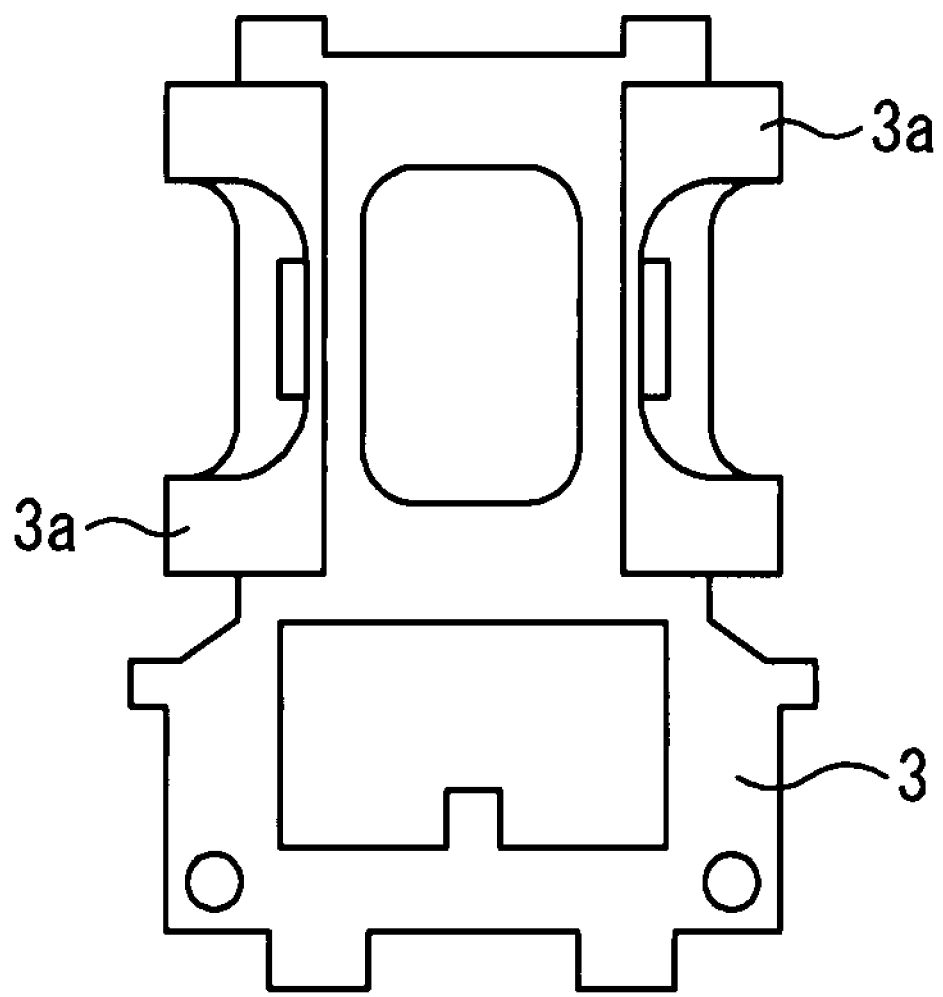
FIG. 5 is a bottom view of the support base for the objective lens actuator.

FIG. 1 is an exploded perspective view of an optical pickup apparatus according to an embodiment of the present invention; FIG. 2 is a bottom view of the optical pickup apparatus; FIGS. 3 and 4 are, respectively, a perspective view and a partial plan view of the optical pickup apparatus showing a state where the objective lens actuator is omitted and the support base therefor is only placed on the base chassis; and FIG. 5 is a bottom view of the support base for the objective lens actuator.

This optical pickup apparatus is to be mounted on, for example, an optical disk recording and reproducing apparatus. As shown in FIG. 1, an objective lens actuator 2 and a support base 3 therefor are mounted on the upper surface (second surface) of a base chassis 1 made of metal such as aluminum die-cast. The objective lens actuator 2 is adapted to drive an objective lens 4 to perform focusing control and tracking control for an optical disk and is positioned in such a manner that the objective lens 4 is positioned just above a collimator lens 5 that is fixed in a hole around the center of the base chassis 1 and exposed at the upper surface of the base chassis 1. It is noted that contact prevention means for preventing the support base 3 from coming into contact with the collimator lens 5 will hereinafter be described in detail.

Meanwhile, as shown in FIG. 2, a laser diode 6 held in a holder 6a and attached to a side wall surface of the base chassis 1, a grating 7 for diffracting a laser beam emitted from the laser diode 6 to generate three beams, a half mirror 8 for reflecting the beams perpendicularly, and a raising mirror 9 for reflecting the perpendicularly reflected beams further upward are installed on the lower surface (first surface) of the base chassis 1, and the raising mirror 9 is positioned just below the collimator lens 5. Then, a light detector 10 for detecting reflected light from the optical disk is attached to the side wall surface of the base chassis 1 on the side opposite to the raising mirror 9 with respect to the half mirror 8.

In addition, as shown in FIG. 1, bearing portions 1a and 1b are formed on either side of the base chassis 1, and the base chassis 1 is to be mounted slidably on an optical disk recording and reproducing apparatus by inserting two guide shafts (primary and secondary shafts) of the optical disk recording and reproducing apparatus into the respective bearing portions 1a and 1b.

The thus arranged optical pickup apparatus is adapted to perform recording and reproduction by applying a laser beam emitted from the laser diode 6 onto an optical disk while moving in the tracking direction along the two guide shafts of the optical disk recording and reproducing apparatus and then by detecting reflected light from the optical disk using the light detector 10. That is, the laser beam emitted from the laser diode 6 is diffracted into three beams at the grading 7, reflected perpendicularly at the half mirror 8, further reflected upward at the raising mirror 9, transmits through the collimator lens 5, and converged through the objective lens 4 to be applied onto the optical disk. Then, the light reflected at the optical disk passes through the objective lens 4 and then the collimator lens 5 to be reflected at the raising mirror 9, and then transmits through the half mirror 8 to be detected in the light detector 10 for recording and reproduction.

The optical pickup apparatus is mainly characterized in that a pair of movement limiting walls 11 and 11 for limiting the horizontal movement of the support base 3 are formed on the upper surface of the base chassis 1 as contact prevention means for preventing the support base 3 from coming into contact with the collimator lens 5 before the support base 3 for the objective lens actuator 2 is fixed adhesively to the upper surface of the base chassis 1.

That is, as shown in FIG. 5, the support base 3 for the objective lens actuator is formed by folding a pair of leg pieces 3a and 3a on the side of the lower surface. On the other hand, since the collimator lens 5 is fixed in the hole around the center of the base chassis 1 in such a manner as to be exposed at the upper surface of the base chassis 1 as mentioned above, the support base 3 may move horizontally on the upper surface of the base chassis 1 to cause the leg pieces 3a and 3a in the support base 3 to come into contact with and thereby scratch the collimator lens 5 until the objective lens actuator 2 is positioned and the support base 3 therefor is fixed adhesively. Hence, in the optical pickup apparatus, as shown in FIGS. 1 to 4, a pair of movement limiting walls 11 and 11 for limiting the horizontal movement of the leg pieces 3a and 3a to prevent the leg pieces 3a and 3a in the support base 3 before fixation from coming into contact with the collimator lens 5 are formed approximately symmetrically in the vicinity of the collimator lens 5 on the upper surface of the base chassis 1 as contact prevention means for preventing the leg pieces 3a and 3a in the support base 3 from coming into contact with the collimator lens 5 in such a manner that movement spaces 12 for adjusting the position of the objective lens actuator (refer to FIG. 4) remain between the movement limiting walls 11 and 11 and the leg pieces 3a and 3a in the support base 3. The movement spaces 12 should be narrower than the clearance between the leg pieces 3a and 3a in the support base 3 and the collimator lens 5. If the movement spaces 12 are wider than the clearance between the leg pieces 3a and 3a and the collimator lens 5, the leg pieces 3a and 3a may disadvantageously come into contact with and thereby scratch the collimator lens 5 before the leg pieces 3a and 3a come into contact with the movement limiting walls 11 and 11 so that the horizontal movement of the support base 3 is limited.

If the pair of movement limiting walls 11 and 11 are thus provided, the collimator lens 5 is protected between the movement limiting walls 11 and 11 and the movements of the leg pieces 3a and 3a in the support base 3 from both one side and the other side toward the collimator lens 5 are limited by the movement limiting walls 11 and 11, which prevents the leg pieces 3a and 3a in the support base 3 from coming into contact with and scratching the collimator lens 5 reliably. In addition, since the movement spaces 12 remain between the movement limiting walls 11 and 11 and the leg pieces 3a and 3a in the support base 3, the operation of adjusting the position of the objective lens actuator 2 cannot be disturbed.

Also, if the movement limiting walls 11 and 11 have a wall length equal to or greater than the diameter of the collimator lens 5 as mentioned above, the movement limiting walls 11 and 11 serve as dust prevention walls to prevent dust from coming in through the clearance between the leg pieces 3a and 3a in the support base 3 and the upper surface of the base chassis 1 in the vicinity of the collimator lens 5, whereby dust can hardly come in and be deposited to result in contaminating the collimator lens 5 and thereby degrading the performance for recording and/or reproduction.

Although in the present embodiment, the pair of movement limiting walls 11 and 11 are formed on the outside of the respective leg pieces 3a and 3a in the support base 3 with the movement spaces 12 being left, the pair of movement limiting walls 11 and 11 may be formed on the inside of the respective leg pieces 3a and 3a in the support base 3 with movement spaces 12 for position adjustment being left, and also in this case, the horizontal movement can be limited reliably to prevent the leg pieces 3a and 3a in the support base 3 from coming into contact with the collimator lens 5, as is the case above. Also, the movement limiting walls 11 and 11 may have a wall length smaller than the diameter of the collimator lens 5. In this case, the function as dust prevention walls may be deteriorated, but the horizontal movement of the support base 3 can be limited reliably to protect the collimator lens 5, as is the case above.

Although the optical pickup apparatus according to the present invention has heretofore been described with reference to certain representative embodiments, the present invention is not restricted to the embodiments above, and it will be appreciated that the present invention is also applicable to, for example, optical pickup apparatuses incorporating a polarizing beam splitter instead of a half mirror, in which a laser beam emitted from a laser diode is diffracted into three beams at a grading, transmits through a polarizing beam splitter, reflected upward at a raising mirror, passes through a collimator lens and then an objective lens to be applied onto an optical disk, and reflected light from the optical disk transmits through the polarizing beam splitter to be detected in a light detector for recording and reproduction.

What is claimed is:

1. An optical pickup apparatus comprising:
   a base chassis having first and second opposing surfaces;
   a laser diode installed on the first surface of the base chassis and emitting a laser beam;
   a grating installed on the first surface of the base chassis and diffracting the laser beam to form plural beams;
   a polarizing beam splitter or half mirror installed on the first surface of the base chassis and redirecting the plural beams;
   a collimator lens installed in a hole in the base chassis and exposed at the second surface;
   an objective lens transmitting a light beam between a light beam reflecting object and the collimator lens and an actuator for focusing the objective lens;
   a raising mirror installed on the first surface of the base chassis, transmitting plural beams between the polarizing beam splitter or half mirror and the collimator lens;
   a support base holding the objective lens and actuator and fixed to the second surface of the base chassis, with leg members extending from opposing sides of the support base into contact with the second surface of the base chassis on opposing sides of the collimator lens as exposed at the second surface, the leg members positioning the support base spaced from the collimator lens; and
   a pair of movement limiting walls extending from the second surface in parallel over the second surface, each movement limiting wall having a length, along the second surface, greater than the diameter of the collimator lens, each movement limiting wall being located adjacent to and spaced from a corresponding leg member of the support base, the movement limiting walls limiting movement of the leg members prior to the support base being fixed to the second surface and thereby preventing scratching of the collimator lens by the support base.

2. An optical pickup apparatus according to claim 1 wherein each movement limiting wall is spaced from its corresponding leg member by a distance less the distance between its corresponding leg member and the collimator lens.

* * * * *